April 12, 1927.
A. SMITH
CLUTCH CONTROL
Filed May 1, 1926
1,624,513
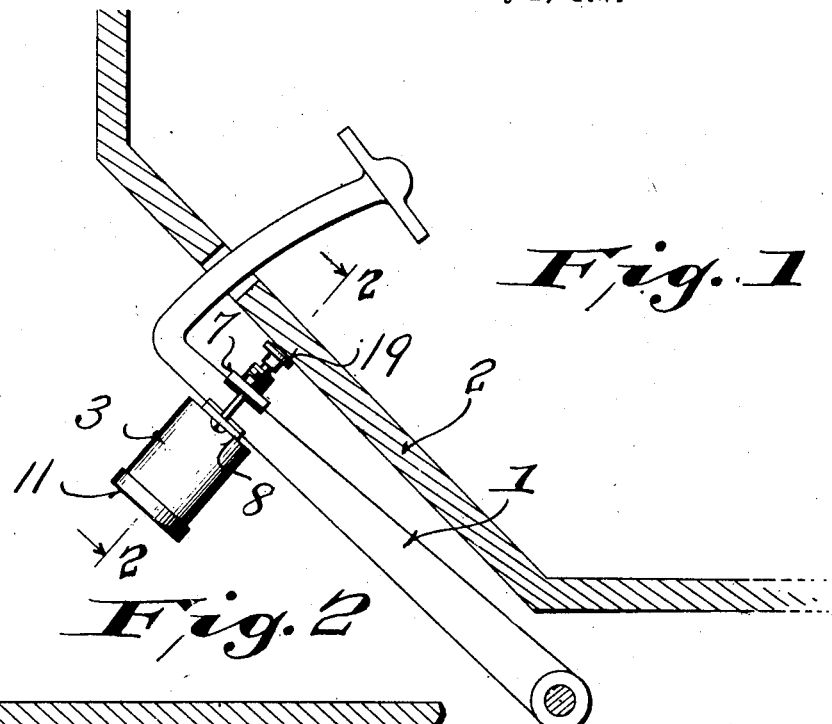
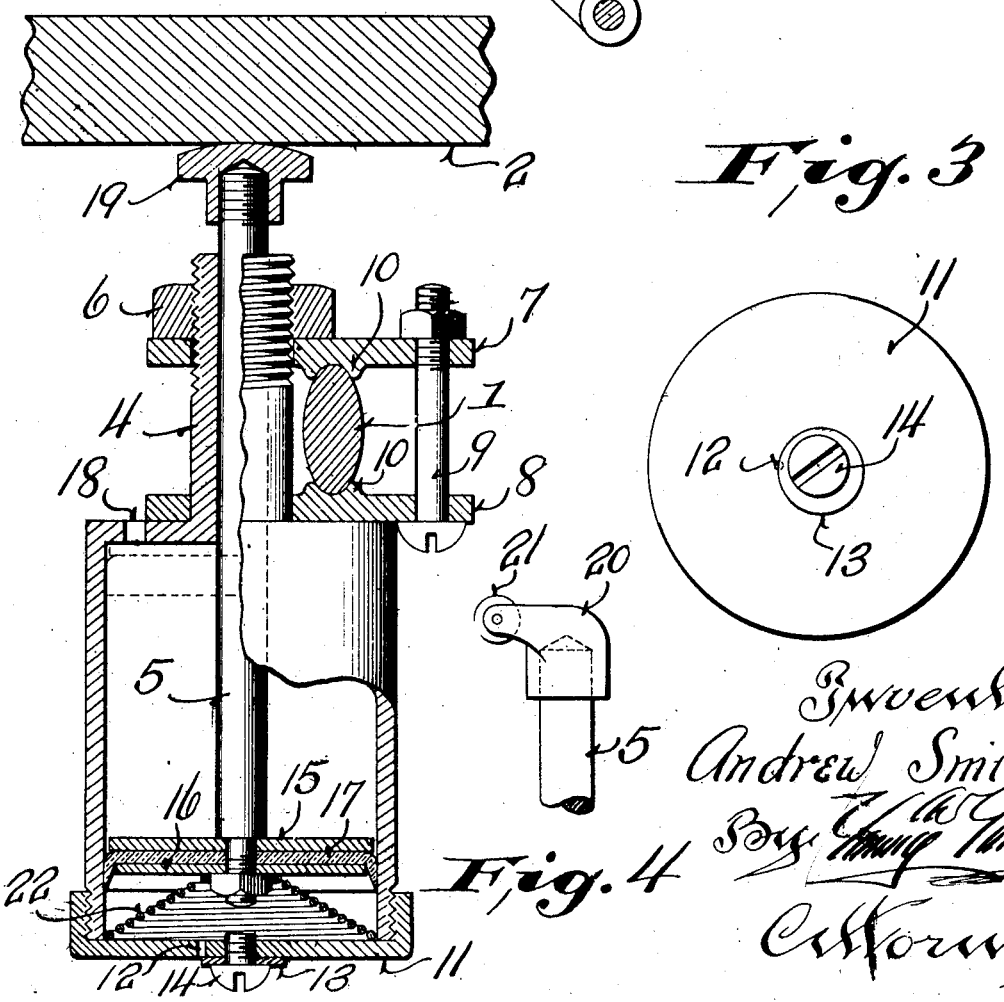

Patented Apr. 12, 1927.

1,624,513

UNITED STATES PATENT OFFICE.

ANDREW SMITH, OF MILWAUKEE, WISCONSIN.

CLUTCH CONTROL.

Application filed May 1, 1926. Serial No. 106,014.

This invention relates to clutch control apparatus for use on automobiles.

It is well known that in the ordinary operation of an automobile an unskilled driver will frequently let his clutch suddenly into closing position with consequent jar and stresses imposed on the mechanism.

This invention is designed to overcome the defects noted above, and objects of such invention are to provide a novel form of clutch control device which will insure a smooth, uniform closing of the clutch without any thought on the part of the operator, which will permit quick opening of the clutch, and which is so constructed that it may be bodily attached and carried by the clutch pedal lever without requiring any attachment to the body of the automobile, or any adjustment.

Further objects are to provide a novel form of clutch control device, which may be readily separated into its component parts for cleaning and removing of dust or grit, and which is so constructed that it may be easily and cheaply manufactured by ordinary machine shop practices.

In general, this invention is an improvement over that disclosed in my co-pending application for clutch control devices, filed April 19, 1926, Serial No. 102,969.

Embodiments of this invention are shown in the accompanying drawings, in which:

Figure 1 is a sectional view through a portion of the automobile showing the device in position.

Figure 2 is an enlarged transverse sectional view on the line 2—2 of Figure 1.

Figure 3 is a view of the bottom cap of the device.

Figure 4 is a fragmentary view of a modified form.

Referring to the drawings, it will be seen that the usual clutch pedal 1 is shown mounted below the body or floor 2 of the automobile. This clutch pedal carries the device which consists of a main cylinder member 3 provided with an elongated attaching neck 4 through which the piston rod 5 passes. This neck is threaded and receives the nut 6, as most clearly shown in Figure 2. Between the nut and the body portion of the device a pair of clamping arms 7 and 8 are positioned and are drawn towards each other by means of the nut and also by means of a bolt 9. They are each provided with inwardly directed spaced lugs 10 which form between them channels for the reception of the clutch pedal lever 1.

The body portion 3 of the device is closed at its lower end by means of the removable cap 11 which is screwed thereon, as shown in Figure 2. This cap is provided with a small exit aperture 12 for the air, such aperture being controlled by the eccentric washer 13 held in place by means of a screw 14, as most clearly brought out in Figure 3. Within the cylindrical member 3 a piston is positioned which is formed of an upper plate 15 and a lower plate 16, between which the leather member 17 is clamped. This leather member is a cup-shaped member with downwardly turned marginal flanges of the well-known type. It is to be noted from reference to Figure 2 that the upper end of the cylinder 3 is in free communication with the external air by means of the opening 18.

The device is, as stated, adapted to be carried wholly by the clutch pedal lever 1 with the piston rod 5 projecting upwardly through the neck 4. The upper end of the piston rod is provided with a head 19 which contacts with the floor or body portion 2 of the automobile.

If desired, a modified form of head, as indicated at 20 in Figure 4, may be provided. This head is equipped with a caster roller 21 so that it will offer the minimum of friction when contacting with the floor or body portion 2 of the automobile. In other words, by having the head 20 pivoted upon the rod 5, it permits the rocking or swinging motion of the head and thus allows the roller 4 to act as an ordinary caster roller.

In using the device it will be readily seen that the entire apparatus is carried bodily downwardly away from the floor-board or body portion 2 when the operator opens the clutch. The operator may remove his foot without damage to the mechanism or the gears, as the closing motion is resisted by this device. It is to be noted, however, when the clutch lever is moved downwardly, that the piston is pressed upwardly by means of the conical spring 22, such spring being removably carried in the lower portion of the cylindrical member 3 and urging the piston upwardly. However, when the clutch is released and the lever moves towards clutch closing position, such motion is resisted by the device and the clutch lever is allowed to move slowly into clutch closing position.

The air trapped beneath the piston is compressed and allowed to escape through the aperture 12, which is restricted by means of the eccentric washer 13. The exact amount of restriction, and consequently the exact speed of closing, may be easily attained by adjusting the washer 13 and by tightening the screw 14 to lock the washer in adjusted position.

It will be seen, therefore, that a highly serviceable and reliable device has been provided for insuring the uniform and easy closing of the clutch without jar to the mechanism.

It is to be noted, further, that the device is so made that the bottom cap may be very quickly and easily removed and thereafter the cylindrical portion may be wiped out or cleaned, as desired, in case any trash may have accumulated within the member. Thus it is an easy matter to maintain the parts in an operative and serviceable condition for an indefinite length of time.

It is to be noted further that the device is entirely practical in construction and may be cheaply and easily produced by ordinary machine shop methods.

It is to be particularly noted that the device is bodily carried by the clutch pedal and does not have to be attached to the body portion of the automobile. It will be seen, therefore, that entire freedom from adjustments of auxiliary lever mechanism is secured by this invention.

Although the invention has been described in considerable detail, such description is intended as illustrative rather than limiting as the invention may be variously embodied and as the scope of such invention is to be determined as claimed.

I claim:—

1. A clutch control device for automobiles comprising a cylindrical member adapted to be bodily carried by a clutch lever, means carried by said member for engaging said lever, said member having a cylindrical portion, and a piston mounted within said cylindrical portion and having a projecting piston rod provided with a head located externally of said cylindrical member, said cylindrical member having a bottom portion provided with a restricted aperture.

2. A clutch control device for automobiles comprising a cylindrical member adapted to be bodily carried by the clutch lever, means carried by said member for engaging said lever, said member having a cylindrical portion, a piston mounted within said cylindrical portion and having a projecting piston rod provided with a head located externally of said cylindrical member, said cylindrical member having a bottom portion provided with a restricted aperture, and a spring carried in the cylindrical portion and urging said piston upwardly.

3. A clutch control device adapted for attachment to the clutch pedal of an automobile, comprising a cylinder having an elongated neck, clamping means carried by said neck for engaging the clutch lever, a piston rod projecting through said neck and having a head on its projecting end, a piston fitting within said cylinder and carried by said piston rod, a removable bottom cap closing the end of said cylinder and provided with an opening, and a spring for urging said piston upwardly, said spring being interposed between said cap and said piston.

4. A clutch control device adapted for attachment to the clutch pedal of an automobile, comprising a cylinder having an elongated neck, clamping means carried by said neck for engaging the clutch lever, a piston rod projecting through said neck and having a head on its projecting end, a piston fitting within said cylinder and carried by said piston rod, a removable bottom cap closing the end of said cylinder and provided with an opening, a spring for urging said piston upwardly, said spring being interposed between said cap and said piston, and means for adjusting said opening.

5. A device for controlling the closing motion of the clutch pedal of an automobile, comprising a cylinder having an elongated threaded neck, a piston rod passing through said neck and having a head on its projecting end, a piston positioned within said cylinder and carried by said rod, clamping means carried by said neck, a nut threaded upon said neck and urging said clamping means towards each other to clamp such means against the clutch pedal, a removable cap carried by the lower end of said cylinder and having an aperture therethrough, an eccentric washer revolubly carried by said cap and adapted to adjustably constrict said aperture, and a conical spring interposed between said cap and said piston.

In testimony that I claim the foregoing I have hereunto set my hand at Milwaukee, in the county of Milwaukee and State of Wisconsin.

ANDREW SMITH.